F. W. HILD & E. T. FLATEBOE.
CAR FENDER.
APPLICATION FILED JAN. 25, 1912.
1,069,063.
Patented July 29, 1913.
4 SHEETS—SHEET 3.
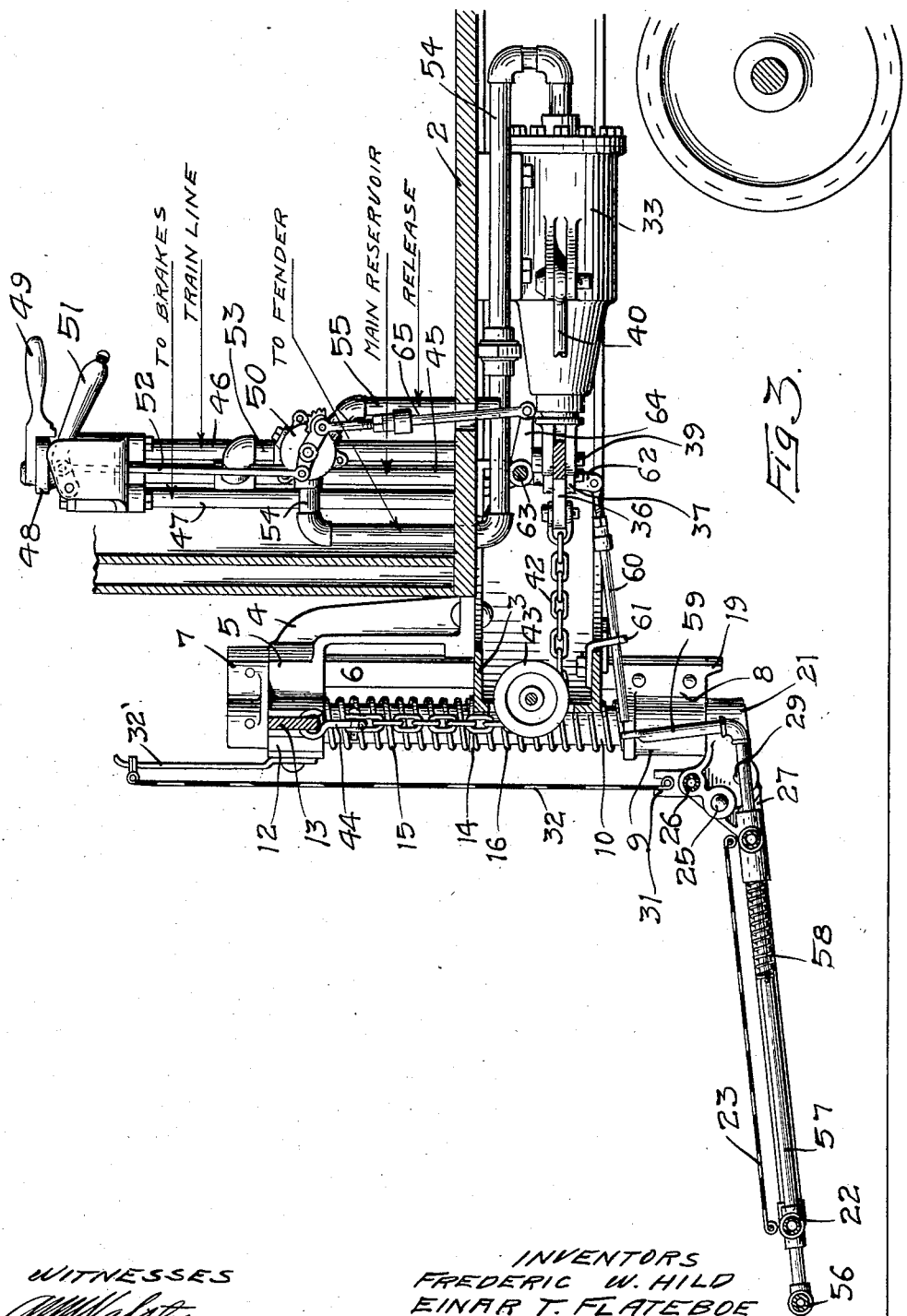
WITNESSES
INVENTORS
FREDERIC W. HILD
EINAR T. FLATEBOE
BY
ATTORNEYS

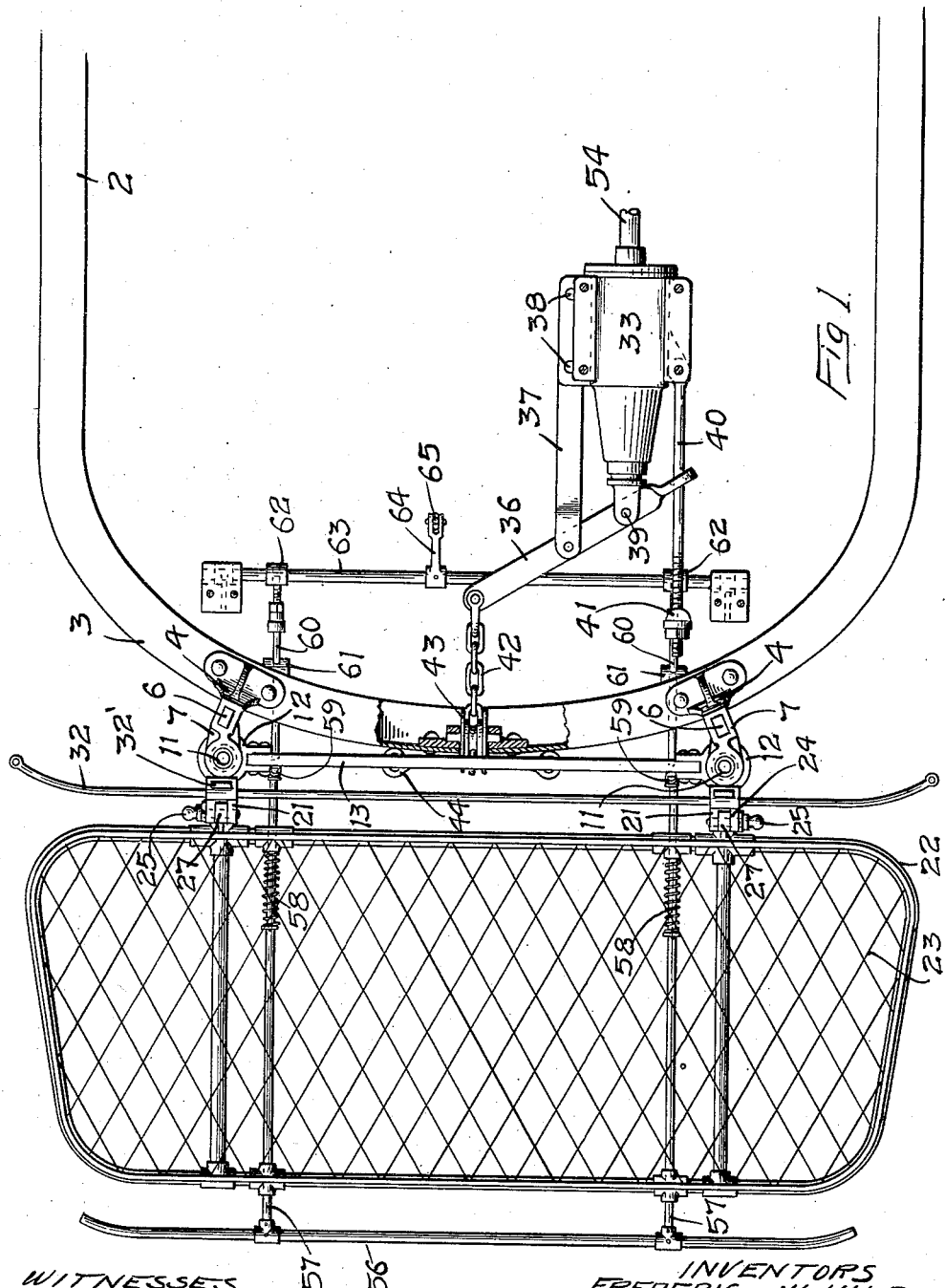

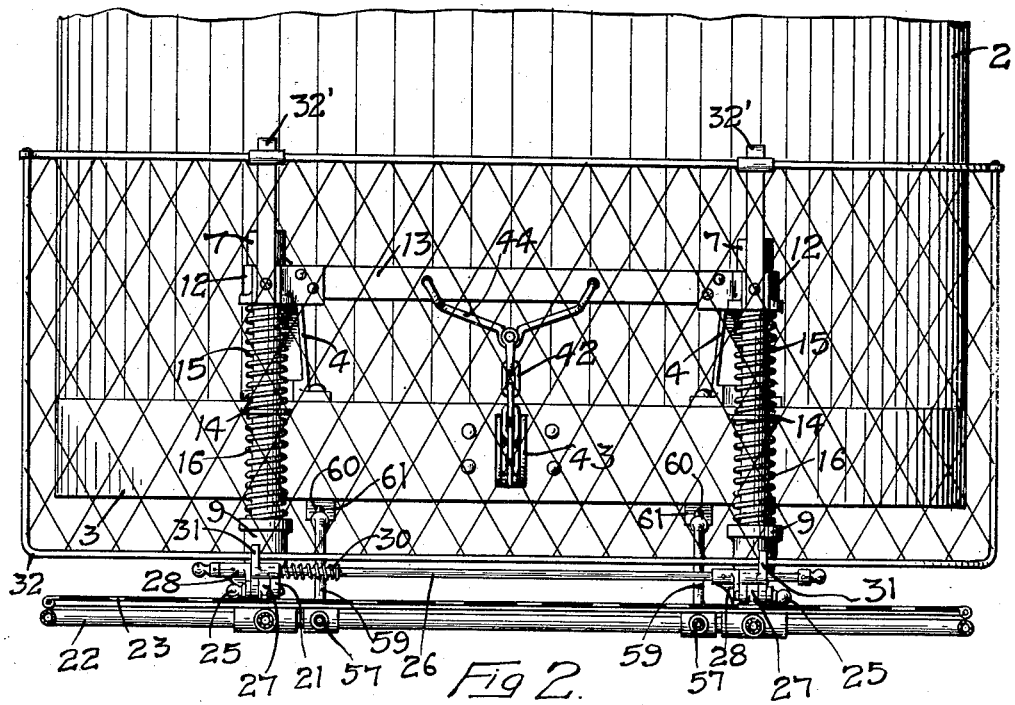
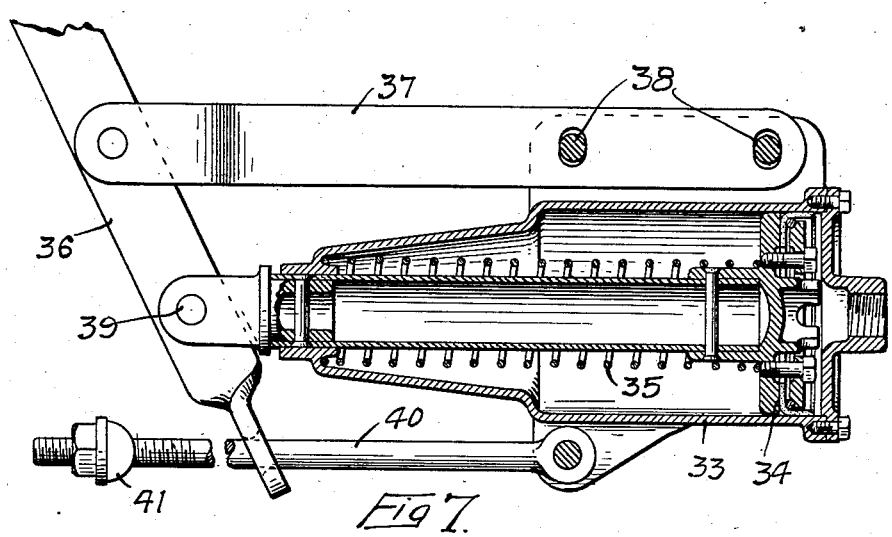

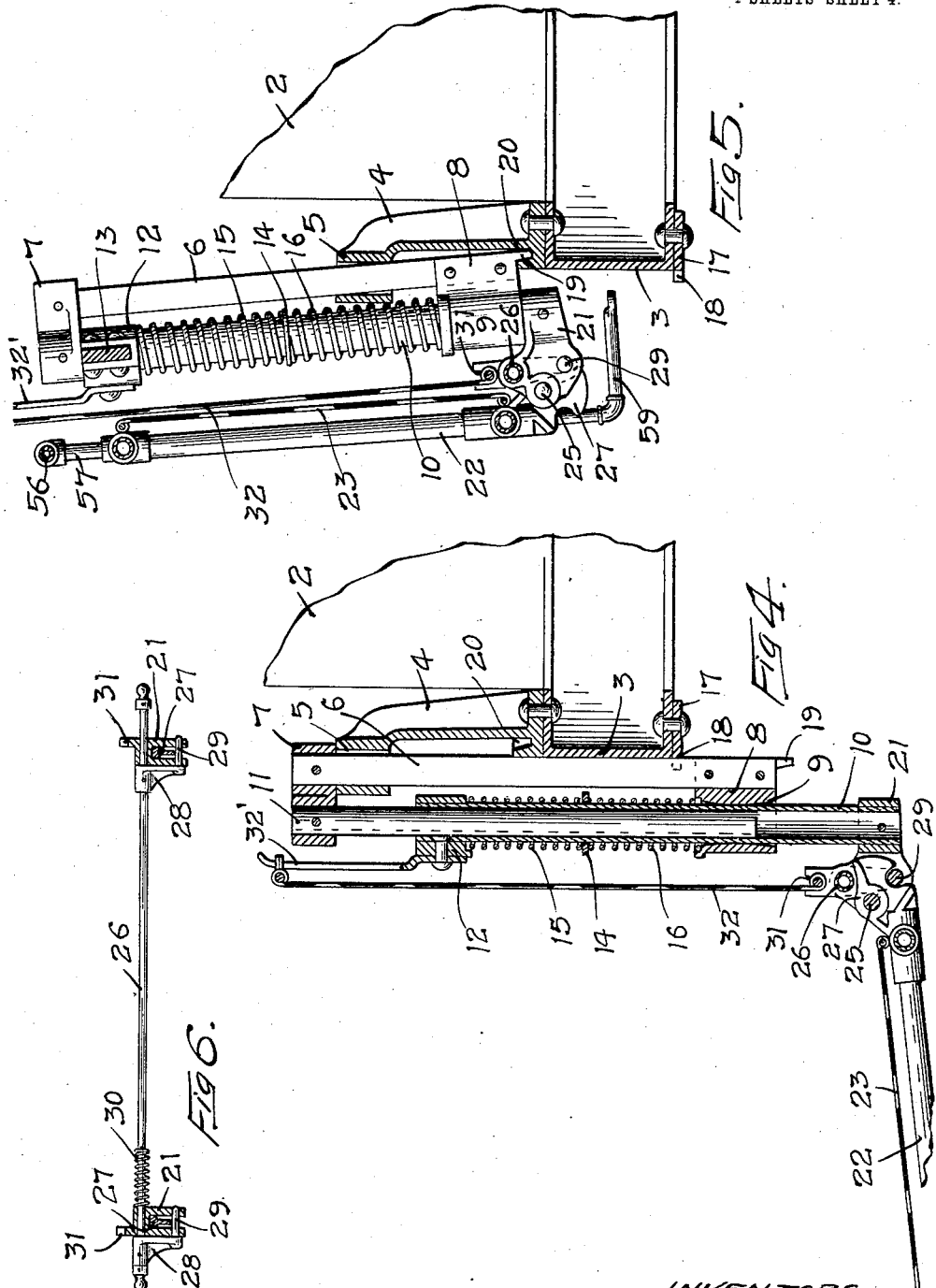

UNITED STATES PATENT OFFICE.

FREDERIC W. HILD, OF PORTLAND, OREGON, AND EINAR T. FLATEBOE, OF SEATTLE, WASHINGTON, ASSIGNORS TO WESTERN AUTOMATIC FENDER CO., INC., OF SEATTLE, WASHINGTON, A CORPORATION.

CAR-FENDER.

1,069,063. Specification of Letters Patent. Patented July 29, 1913.

Application filed January 25, 1912. Serial No. 673,382.

*To all whom it may concern:*

Be it known that we, FREDERIC W. HILD, of Portland, Multnomah county, Oregon, and EINAR T. FLATEBOE, of Seattle, King county, Washington, have invented certain new and useful Improvements in Car-Fenders, of which the following is a specification.

Our invention relates to car fenders and particularly to those designed for use in connection with street cars where the dropping of the fender is controlled from the motorneer's controlling lever.

The primary object of our invention is to provide a fender which can be folded and raised to an inoperative position above the bumper of the car to the end that should the car get out of order it may be easily and quickly coupled to another car without removing the fender from the car.

A further object is to simplify the construction of the fender and reduce its weight and the cost of manufacture and installation.

Other objects of the invention will appear from the following detailed description.

The invention consists generally in various constructions and combinations, all as hereinafter described and particularly pointed out in the claims.

In the accompanying drawings forming part of this specification, Figure 1 is a plan view of the apparatus applied to a car, Fig. 2 is a front view thereof, Fig. 3 is a longitudinal, vertical, sectional view of the forward portion or platform of the car, showing the application of our improved invention thereto, Fig. 4 is a vertical sectional view through the car bumper, showing the fender in its lowered position, Fig. 5 is a similar view, illustrating the fender raised and hung on the car bumper in position to allow the coupling of the car to another car, Fig. 6 is a detail view of the device for locking the hinged forward portion of the fender in its raised or lowered position, Fig. 7 is a detail sectional view of the fluid pressure controlling cylinder.

In the drawing, 2 represents the forward platform of the car and 3 the bumper.

4 represents brackets bolted to the bumper on each side of the middle portion thereof. The brackets 4 have guides 5 at their upper ends in which bars 6 are vertically slidable. Castings 7 are secured to the upper ends of said bars and normally rest on the brackets 4. Brackets 8 are secured to the lower ends of the bars 6 and have guides 9 wherein tubes 10 are vertically slidable. Rods 11 are secured at their upper ends to the head castings 7 and depend therefrom parallel and in front of the bars 6 and the lower ends of these rods telescope within the tubes 10. Castings 12 are secured to the upper ends of the tubes 10 and are connected with one another across the front of the car by a bar 13. Freely movable washers 14 are provided on the tubes 10 and springs 15 and 16 are coiled on said tubes above and below the washers and the tension of these springs normally tends to hold the tubes 10 and the cross bar 13 at the limit of their upward movement, or in contact with the head castings 7, as indicated in Fig. 3. The springs 16 have fixed bearings in the top of the brackets 8. Plates 17 are bolted to the underside of the bumper and have notches 18 therein to receive the bars 6 and hold them against lateral movement, forming cam guides for the vertical movement of said bars. The lower ends of the brackets 8 have lugs 19 formed thereon which, when the bars are raised with the fender to the position shown in Fig. 5, are adapted to drop into recesses 20 provided in the brackets 4 and thereby hold the fender in its elevated position, the guides 5 being sufficiently large to allow freedom of movement of the bars 6 in raising and lowering the fender and in tilting it to move the lugs 19 into and out of engagement with the recesses 20.

At the lower ends of the tubes 10 we provide brackets 21 projecting forwardly therefrom and forming supports for the fender apron. This apron comprises a frame 22 having a filler 23 of suitable mesh, said frame being pivotally connected with the brackets 21. This frame is hinged at 24 to the brackets 21, the hinge pins 25 being removable to allow the apron to be easily and quickly detached from the remaining portion of the fender. The apron is adapted to swing to a substantially vertical position on its hinges and for the purpose of locking the fender apron in its lowered, operative position or in its raised, inoperative position we prefer to provide a rod 26, shown in detail in Fig. 6, adapted to slide lengthwise in bearings in the brackets 21. Ears 27 project from the rear of the frame 22 and through these ears the pivot pins 25 pass. At each end the rod 26 is provided with brackets 28 having pins 29 adapted to enter holes in the brackets 21 in the path of the ears 27, being held in said holes by the tension of a spring 30. When the rod 26 is moved endwise and the pins 29 withdrawn from their sockets, the fender apron is free to swing up or down. When the pins are in the sockets in the brackets 21, as indicated in Fig. 4, the fender apron will be locked in its lowered position and when the pins are thrust into their sockets in the rear of the ears 27, as indicated in Fig. 5, the fender apron will be locked in its raised position. The brackets 21 have seats 31 for the lower end of a life guard 32, the upper end of which is slidable vertically on guides 32' mounted on the castings 12.

The normal raised position of the fender is shown in Fig. 3, and for the purpose of pulling this fender down to the track to pick up an obstruction we prefer to employ a fluid pressure cylinder 33 horizontally arranged beneath the car platform and having a piston 34 normally held in its retracted position by a spring 35. A lever 36 is pivoted at a point intermediate to its ends on a bar 37 loosely mounted at 38 on a suitable support, such as the wall of the cylinder, said lever being pivotally connected at 39 with the cylinder piston and having its end near said piston slidable on a pivoted rod 40 that is provided with an adjustable stop 41. The opposite end of the lever 36 is connected to a chain 42 which passes under a sheave 43 mounted under the car platform and extends up to a bail 44 carried by the middle portion of the cross bar 13. When, therefore, fluid pressure is admitted to the cylinder 33 in the rear of the piston, the lever 36 will be oscillated to pull the chain or other flexible connection 42, draw down the cross bar 13 and force the fender down to the track rails so that the apron will be in position to pick up an obstruction on the track. As soon as the piston is relieved of the fluid pressure its spring will move the piston backwardly, allowing the flexible connection between the piston and the fender to become slack and the tension of the springs 15 and 16 will raise the fender apron above the track rails to the position indicated in Fig. 3. We prefer to connect the cylinder with the fluid pressure brake controlling mechanism.

Referring to Fig. 3, 45 represents a pipe connected with the main reservoir. 46 is a train line pipe and 47 is the pipe connection with the brake cylinders. 48 is the motorneer's controlling valve and 49 the controlling lever. 50 is an auxiliary valve. The lever 51 lies in the path of the controlling lever 49 and a rod 52 connects the lever 51 with the auxiliary valve 50. A branch pipe 53 leads from the reservoir pipe 45 to the auxiliary valve and a pipe 54 leads from the auxiliary valve to the cylinder 33. By this means the driver of the car by the operation of the levers 49 and 51 may admit fluid pressure to the cylinder 33 to operate the piston and lower the car fender. The auxiliary valve is provided with an exhaust 55 on which the valve is set to allow the release of the air from the cylinder 33. To provide for the automatic tripping and descent of the fender when striking an obstruction on the track, we arrange a bar 56 in front of the fender apron, supported on slidable rods 57 which have bearings in the frame of the apron and are normally held in their projected position by springs 58. The rear ends of these rods have upwardly projecting extensions 59 which are adapted to contact with rods 60 slidable in guides 61 and pivotally connected at their rear ends with arms 62 secured on a rock shaft 63 which has bearings under the car platform. A crank 64 is secured to said shaft and a rod 65 connects said crank with the auxiliary valve 50 so that when the bar 56 strikes an obstruction the valve will be opened to admit fluid pressure to the cylinder 33 and draw the fender apron down upon the track in position to engage and gather up the person or obstruction thereon.

With this type of fender two cars can be easily and quickly connected together by means of their draw-bars, the mechanism providing for the raising of the entire fender above the bumper to allow freedom of movement of the draw-bar and coupling, and to do this it is only necessary to disconnect the pull chain from the fender cross bar. A further advantage in this type of fender lies in the fact that by merely withdrawing the pivot pins the fender can be easily and quickly detached from the car.

To raise the fender to the position indicated in Fig. 5 it is only necessary to depress the fender apron by the pressure of the foot sufficiently to slacken and disconnect the chain 42 when the fender will be released and can be lifted and hung on the bumper bracket.

We claim as our invention:—

1. The combination, with a car platform and bumper, of a vertically slidable fender support, guides for said support, a fender, including an apron and life guard carried by said support and capable of vertical movement therewith to a point above the lower portion of said bumper, and means for holding said support and fender in their raised position.

2. The combination, with a car platform and a bumper, of bars having vertical guides on said bumper, a fender carried by said bars, said bars and fender being adapted to be raised to a point above the level of the lower portion of said bumper, and means supporting said bars in their raised position.

3. The combination, with a car platform and bumper and brackets having guides mounted on said bumper, of bars vertically slidable in said guides, a fender carried by said bars, said bars and fender being adapted to be raised to a point above the level of the lower portion of said bumper, and means supporting said bars in their raised position.

4. The combination, with a car platform and bumper, and brackets having guides therein, bars vertically slidable in said guides, brackets secured to the lower ends of said bars, a fender carried by said last named brackets and slidable vertically with said bars, said first-named brackets having recesses therein and said second named brackets having lugs to enter said recesses and support said bars and fender in their raised position.

5. The combination, with a car platform and bumper, of a vertically slidable fender, a fluid pressure cylinder and piston therefor, means controlling the admission of fluid pressure to said cylinder, and flexible means connecting said fender with said piston and operating to depress said fender when said cylinder piston is operated.

6. The combination, with a car platform and bumper, of a vertically movable fender and guides therefor, a fluid pressure cylinder and piston and means controlling the admission of fluid pressure to said cylinder, a sheave mounted in said platform, flexible means attached to said fender and passing under said sheave and said piston, the movement of said piston operating to depress said fender.

7. The combination, with a car platform and bumper, of a vertically movable fender, a cylinder disposed horizontally beneath said platform in the rear of said fender, a piston for said cylinder, means controlling the admission of fluid pressure to said cylinder and means connecting said piston with said fender and operating to depress said fender when fluid pressure is admitted to said cylinder.

8. The combination, with a car platform and bumper, of a vertically slidable fender, guides therefor, springs for holding said fender in its raised position and means located in the rear of said fender and operatively connected therewith and arranged to depress said fender against the tension of said springs.

9. The combination, with a car platform and bumper, of a vertically slidable fender and guides therefor, a fluid pressure cylinder in the rear of said fender, a piston for said cylinder, means controlling the admission of fluid pressure to said cylinder, a lever mechanism connected with said piston and flexible means connecting said lever mechanism with said fender.

10. The combination, with a car platform and bumper, of a fender support slidable thereon, a fender carried by said support and capable of vertical movement with said support to a point above said bumper and also adapted to slide vertically independently of said support, springs for normally holding said fender in its raised position, and means for depressing said fender against the tension of said springs.

11. The combination, with a car platform and bumper, of a vertically slidable fender and guides therefor, springs for normally holding said fender in its raised position, a sheave mounted in said bumper, flexible means attached to said fender and passing under said sheave, a fluid pressure cylinder having its piston connected to said flexible means, means controlling the admission of fluid pressure to said cylinder, downward pressure on said fender against the tension of said springs allowing said flexible means to be detached to disengage said fender from said cylinder piston.

12. The combination, with a car platform and bumper, of a vertically slidable support and guides therefor, a fender apron having a hinged connection with said support and adapted to slide vertically therewith and also having an independent movement on its hinges to a vertical position, and means supporting said fender apron and its support in a raised position above said bumper.

13. The combination, with a car platform, of a vertically movable fender support mounted thereon, a fender apron having a hinged connection with said support and adapted to swing to a substantially upright position, said fender apron also being movable vertically with said support to a point above the car bumper to allow freedom of movement of the car draw-bar.

14. The combination, with a car platform, of a fender support including depending rods and tubes telescoping therewith, a fender frame carried by said tubes and vertically slidable therewith, springs inclosing said tubes and normally tending to hold said tubes and frame in a raised position, a cross bar between said tubes and connected thereto, and means engaging said cross bar for forcing said tubes downwardly to depress said fender frame and put said springs under tension.

15. The combination, with a car platform, of brackets supported thereby, a fender frame pivotally connected with said brackets and having rearwardly extending ears, pins fitting within sockets in said brackets and adapted to engage the underside of said ears and lock said frame in its lowered operative position, said pins engaging the upper edges of said ears when said frame is raised to an upright position and locking it in its raised, inoperative position.

16. The combination, with a car platform, of brackets carried thereby, a fender frame pivotally connected with said brackets and having rearwardly projecting ears, a rod slidable lengthwise in said brackets, pins carried by said rod and fitting within sockets in said brackets in the path of said ears and arranged to engage said ears and lock said frame in its lowered, operative position or in its raised, inoperative position.

17. The combination, with a car platform, of a vertically movable fender and guides therefor, a fluid pressure cylinder and piston, means controlling the admission of fluid pressure to said cylinder, a sheave mounted in said platform, springs for normally holding said fender in its raised position, a chain attached to said fender and passing under said sheave, and a lever pivotally connected with said piston and with said chain.

18. The combination, with a car frame and bumper, of a vertically slidable fender support and a fender carried thereby, guides mounted on said car frame and wherein said fender support is slidable, said guides having recesses above said bumper and said fender support having lugs to enter said recesses.

19. The combination, with a car platform and bumper, of a vertically slidable fender support, guides for said support, a fender carried by said support and capable of vertical movement therewith to a point above said bumper, and means for holding said support and fender in their raised position.

20. The combination, with a car platform and bumper, of a fender and means supporting it in front of said bumper, said fender being capable of movement to a point above the normal location of the car draw-bar, and means for supporting the fender in its raised position.

21. The combination, with a car platform and bumper, of a fender, a support therefor arranged in front of said bumper and normally depending below the same in the operative position of said fender, said fender and support being capable of vertical movement to an inoperative position above the normal location of the car draw-bar.

In witness whereof, we have hereunto set our hands, FREDERIC W. HILD at Minneapolis, Hennepin county, Minnesota, this 30th day of December, 1911, and EINAR T. FLATEBOE, at Seattle, King county, Washington, this 13th day of January, 1912.

FREDERIC W. HILD.
   EINAR T. FLATEBOE.

In presence of—
 GENEVIEVE E. SORENSEN,
 J. W. LYSONS.

---

Copies of this patent may be obtained for five cents each, by addressing the "Commissioner of Patents, Washington, D. C."